(12) United States Patent
Smadi et al.

(10) Patent No.: US 10,264,591 B2
(45) Date of Patent: Apr. 16, 2019

(54) MITIGATING INTERFERENCE BETWEEN CO-LOCATED WIRELESS TECHNOLOGIES

(71) Applicant: BlackBerry Limited, Waterloo, Ontario (CA)

(72) Inventors: Mohammed Nawaf Smadi, Ancaster (CA); Goran Hageltorn, Ottawa (CA); Ghada Badawy, Burlington (CA)

(73) Assignee: BlackBerry Limited, Waterloo (CA)

( * ) Notice: Subject to any disclaimer, the term of this patent is extended or adjusted under 35 U.S.C. 154(b) by 13 days.

(21) Appl. No.: 15/609,180

(22) Filed: May 31, 2017

(65) Prior Publication Data
US 2017/0273098 A1    Sep. 21, 2017

Related U.S. Application Data

(62) Division of application No. 13/971,176, filed on Aug. 20, 2013, now Pat. No. 9,699,801.

(51) Int. Cl.
*H04W 72/12* (2009.01)
*H04W 88/06* (2009.01)

(52) U.S. Cl.
CPC ........ *H04W 72/1215* (2013.01); *H04W 88/06* (2013.01); *Y02D 70/00* (2018.01);
(Continued)

(58) Field of Classification Search
None
See application file for complete search history.

(56) References Cited

U.S. PATENT DOCUMENTS

| 8,300,563 B2 | 10/2012 | Krishnaswamy et al. |
| 9,295,096 B1 | 3/2016 | Shukla |

(Continued)

FOREIGN PATENT DOCUMENTS

| WO | 2010137777 | 12/2010 |
| WO | 2011123531 | 10/2011 |
| WO | 2013048512 | 4/2013 |

OTHER PUBLICATIONS

Shi, First Office Action for CA2852194, dated Aug. 18, 2015.
(Continued)

*Primary Examiner* — Adnan Baig
(74) *Attorney, Agent, or Firm* — Integral IP; Miriam Paton; Amy Scouten

(57) ABSTRACT

An apparatus has a first communication module that is compatible with a first wireless communication technology, and a second communication module that is compatible with a second, different, wireless communication technology. Transmissions by each communication module may contribute to interference at the other communication module. In one example, a Block Acknowledgement Request is transmitted by the apparatus during a downlink period of the second communication module so that the Block Acknowledgement transmitted in response is received during the downlink period. In another example, the apparatus calculates a maximum size of A-MPDU to receive and notifies an access point of that maximum size. In a further example, the apparatus, having notified an access point of operation in a power save mode, polls the access point for buffered frames at the start of a downlink period of the second communication module.

10 Claims, 12 Drawing Sheets

(52) U.S. Cl.
CPC ...... *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | |
|---|---|---|
| 2008/0068999 A1 | 3/2008 | Ishii et al. |
| 2009/0086709 A1 | 4/2009 | Pani et al. |
| 2009/0245216 A1* | 10/2009 | Banerjea ............... H04W 16/14 370/338 |
| 2010/0260049 A1 | 10/2010 | Racz et al. |
| 2010/0304770 A1 | 12/2010 | Wietfeldt et al. |
| 2011/0310869 A1 | 12/2011 | Xhafa et al. |
| 2012/0120944 A1 | 5/2012 | Yang et al. |
| 2012/0170557 A1 | 7/2012 | Tsfati et al. |
| 2012/0218979 A1 | 8/2012 | Yeh et al. |
| 2013/0155931 A1* | 6/2013 | Prajapati ............. H04W 72/044 370/311 |
| 2013/0343236 A1* | 12/2013 | Chen .................... H04W 88/06 370/278 |
| 2013/0343275 A1 | 12/2013 | Merlin et al. |

OTHER PUBLICATIONS

Shi, Second Office Action for CA2852194, dated Apr. 29, 2016.
Stefan, Partial Search Report for EP14170233, dated Nov. 13, 2014.
Stefan, Extended European Search Report for EP14170233, dated Mar. 3, 2015.
Stefan, Extended European Search Report for EP16167276, dated Jul. 13, 2016.

\* cited by examiner

MITIGATING INTERFERENCE BETWEEN CO-LOCATED WIRELESS TECHNOLOGIES

TECHNICAL FIELD

The technology described herein relates generally to co-existence of wireless communication technologies.

BACKGROUND

A single apparatus may be equipped to communicate using more than one wireless communication technology. The apparatus may comprise a first radio that is operable in a first radio frequency band, and a second radio that is operable in a second radio frequency band that overlaps or is adjacent or is near the first radio frequency band. Consequently, depending on the transmit power spectral density, some of the transmissions from the second radio are expected to cause desensitization of the receiver of the first radio and prevent reception of downlink (DL) traffic by the receiver of the first radio. Similarly, depending on the transmit power and the frame duration, some of the transmissions from the first radio are expected to cause desensitization of the receiver of the second radio and prevent reception of DL traffic by the receiver of the second radio.

In one example, receivers of co-located Long Term Evolution (LTE) and wireless local area network (WLAN) radios are known to suffer from de-sensing as a result of overlapping or adjacent or near frequency bands.

DETAILED DESCRIPTION

The teachings of this paper apply to an apparatus that comprises both a first communication module and a second communication module. In other words, the first communication and the second communication module are "co-located", because they are contained within the housing of the apparatus and are always in the same location.

Figure 1:
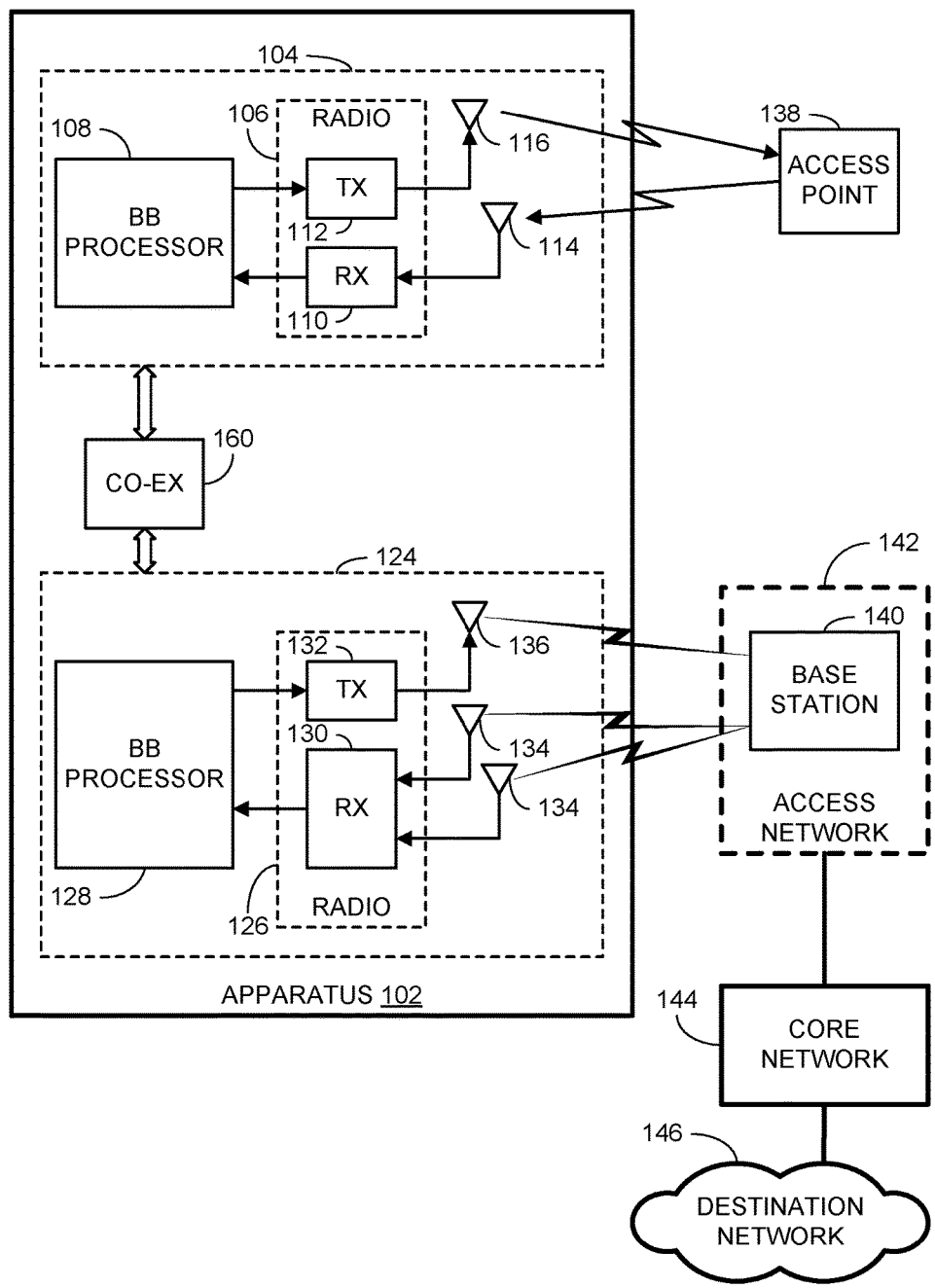
FIG. 1 illustrates an example network architecture involving an apparatus with co-located wireless communication technologies.

FIG. 1 is an illustration of an example network architecture involving an apparatus 102 with co-located wireless communication technologies.

The apparatus 102 has a first communication module, generally referenced 104, that is compatible with a first wireless communication technology. The first communication module 104 includes a first radio 106 coupled to a first baseband (BB) processor 108, and one or more first antennae coupled to the first radio 106. The first radio 106 includes a receiver (RX) 110 and a transmitter (TX) 112. At least one of the first antennae is used as a receiver antenna 114 by the receiver 110. At least one of the first antennae is used as a transmitter antenna 116 by the transmitter 112. Although not illustrated as such, it is possible for the receiver antenna 114 and the transmitter antenna 116 to be a single antenna. Although not illustrated as such, it is possible for the one or more first antennae to be external to the apparatus 102. The transmitter 112 is operable to put channel bits output by the first BB processor 108 into a form that permits their communication upon radio frequency (RF) channels and causes the communication of the channel bits upon the RF channels via the transmitter antenna 116. For example, the transmitter 112 may comprise upconverters, modulators, a power amplifier, and other components. The receiver 110 is operable to receive radio frequency signals via the receiver antenna 114, to amplify and to demodulate the received signals, to down-convert the demodulated signals to baseband frequencies, and to perform other operations, for example, soft decision operations or hard decision operations, in order to derive received bits for processing by the first BB processor 108.

The apparatus 102 has a second communication module, generally referenced 124, that is compatible with a second wireless communication technology that differs from the first wireless communication technology. The second communication module 124 includes a second radio 126 coupled to a second baseband processor 128, and one or more second antennae coupled to the second radio 126. The second radio 126 includes a receiver 130 and a transmitter 132. At least one of the second antennae is used as a receiver antenna 134 by the receiver 130. At least one of the second antennae is used as a transmitter antenna 136 by the transmitter 132. Although not illustrated as such, it is possible for the receiver antenna 134 and the transmitter antenna 136 to be a single antenna. Although not illustrated as such, it is possible for the one or more second antennae to be external to the apparatus 102. The transmitter 132 is operable to put channel bits output by the second BB processor 128 into a form that permits their communication upon RF channels and causes the communication of channel bits upon the RF channels via the transmitter antenna 136. The receiver 130 is operable to receive radio frequency signals via the receiver antenna 134, to amplify and to demodulate the received signals, to down-convert the demodulated signals to baseband frequencies, and to perform other operations, for example, soft decision operations or hard decision operations, in order to derive received bits for processing by the second BB processor 128.

The first radio 106 is operable in one or more channels of a first radio frequency band, and the second radio 126 is operable in a second radio frequency band that overlaps or is adjacent or is near the first radio frequency band. Consequently, depending on the transmit power spectral density, some of the transmissions from the second radio 126 are expected to jam the receiver 110 and prevent reception by the receiver 110 of any downlink (DL) traffic. Similarly, depending on the transmit power and the frame duration, some of the transmissions from the first radio 106 are expected to jam the receiver 130 and prevent reception by the receiver 130 of any DL traffic.

The first wireless communication technology may be based on any one or any combination of the IEEE 802.11 family of wireless local area network (WLAN) standards (as described in IEEE Std. 802.11™-2012 published 29 Mar. 2012 by IEEE Computer Society) or future related standards. For example, the first wireless communication technology may be based on IEEE 802.11g, as published in Clause 19 of IEEE Std. 802.11™-2012, or based on IEEE 802.11n, as published in Clause 20 of IEEE Std. 802.11™-2012. In that example, the first radio frequency band may be the unlicensed industrial, scientific, and medical (ISM) 2.4 GHz band. The term "Wi-Fi®" refers to interoperable implementations of the IEEE 802.11 family of WLAN standards certified by the Wi-Fi Alliance.

The first communication module 104 is operable to communicate with a wireless access point (AP) 138 that is compatible with the first wireless communication technology. The AP 138 therefore supports a wireless network which one or more client devices, including the apparatus 102, may join. The apparatus 102 may use the AP 138 to access services and other devices via a distribution system (not shown). Alternatively, client devices that have joined the wireless network may use the AP 138 for intra-networking to communicate—without traversing any distribution system (not shown)—with others of the client devices that have joined the wireless network. The first communication module 104 may also be operable as an AP, however this document is concerned with its operation as a client device. For simplicity, the first communication module 104 will herein be referred to as the WLAN communication module 104.

The second wireless communication technology may be based on 3$^{rd}$ Generation Partnership Project (3GPP) Long Term Evolution (LTE) or LTE-Advanced, or future related standards. 3GPP LTE is also known as Evolved Universal Terrestrial Radio Access (E-UTRA) (Release 8). In this case, the apparatus 102 is referred to as LTE user equipment (UE) or E-UTRA UE.

The second communication module 124 is operable to connect to a wireless base station 140 that is compatible with the second wireless communication technology. The wireless base station 140 is part of an access network 142 that, together with a core network 144, enables the apparatus 102 to communicate with a destination network 146, for example, the Internet or a private intranet. Specific details of the access network 142 and the core network 144 may depend on the nature of the second wireless communication technology. In the case that the second wireless communication technology is based on LTE or LTE-Advanced, the wireless base station 140 is referred to as evolved base node (eNB). For simplicity, the second communication module 124 will herein be referred to as the LTE communication module 124.

A co-existence module 160 is coupled via a logical or physical bus to the WLAN communication module 104 and to the LTE communication module 124. The co-existence module 160 is operative to enhance co-existence between the WLAN communication module 104 and the LTE communication module 124, as described in more detail herein.

Figure 2:
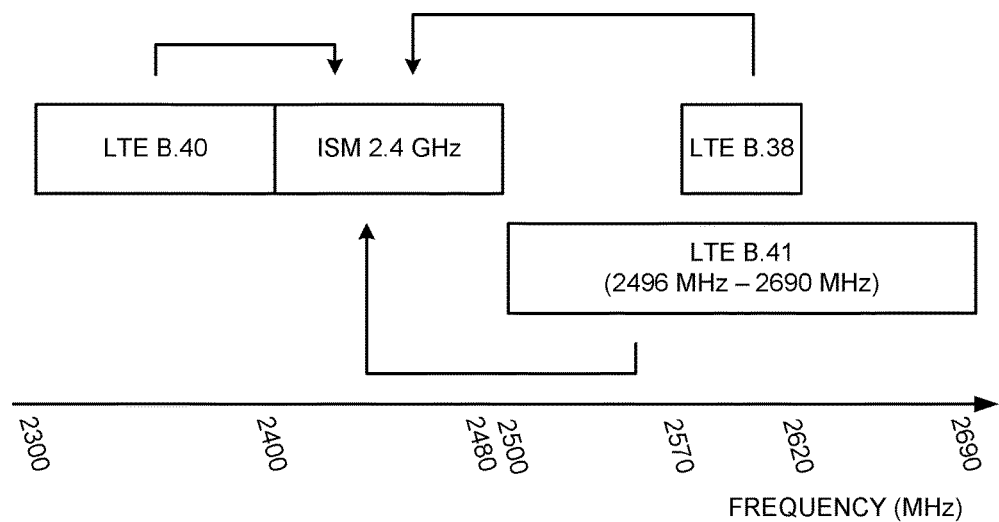
FIG. 2 illustrates the proximity of certain frequency bands of Long Term Evolution (LTE) to the unlicensed industrial, scientific, and medical (ISM) 2.4 GHz band.

As illustrated in FIG. 2, certain time division duplex (TDD) operating bands of LTE, as defined in 3GPP TS36.36104x-851, are adjacent or near the ISM 2.4 GHz band. Specifically, operating band 40 (LTE B40) is from 2300 MHz to 2400 MHz, operating band 41 (LTE B41) is from 2496 MHz to 2690 MHz, and operating band 38 (LTE B38) is from 2570 MHz to 2620 MHz.

Figure 3:
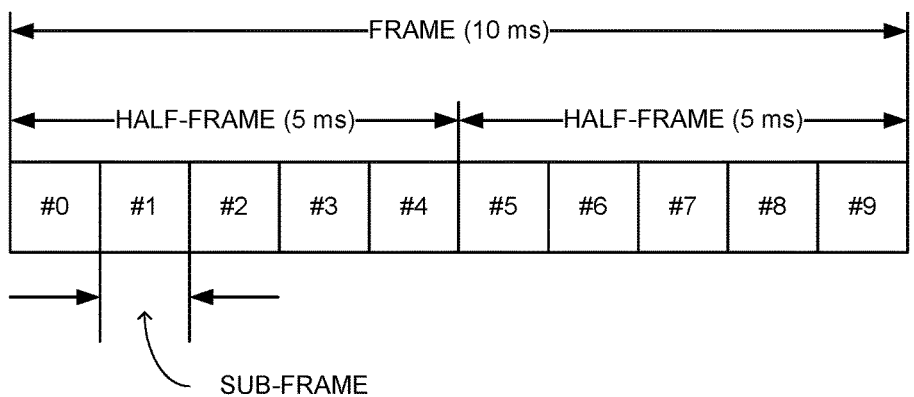
FIG. 3 illustrates the structure of an LTE time division duplex (TDD) frame.

FIG. 3 illustrates the structure of an LTE TDD frame. Each LTE frame in TDD mode is of 10 ms duration. Within each frame, there are 10 subframes (each of duration 1 ms). Special subframes are specifically defined for backward compatibility with Time Division Synchronous Code Division Multiple Access (TD-SCDMA). An LTE TDD frame configuration identifies which subframes are reserved for the downlink (DL), which subframes are reserved for the uplink (UL), and which subframes are special subframes used for guard time.

Currently, seven different frame configurations have been set. These frame configurations are described in Table 1:

| Uplink-Downlink Configuration | Downlink to Uplink Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where D denotes a subframe reserved for the downlink, U denotes a subframe reserved for the uplink, and S denotes a special subframe used for guard time. Subframes 0 and 5 are always reserved for DL transmission because those two subframes need to carry the synchronization signal for cell identification. Subframes immediately following the special subframes are always reserved for UL transmissions. Other subframes can be configured for either DL or UL transmission.

More details can be found in TS36.211 on physical channels and modulations and TS36.213 on physical layer procedures.

Figure 4:
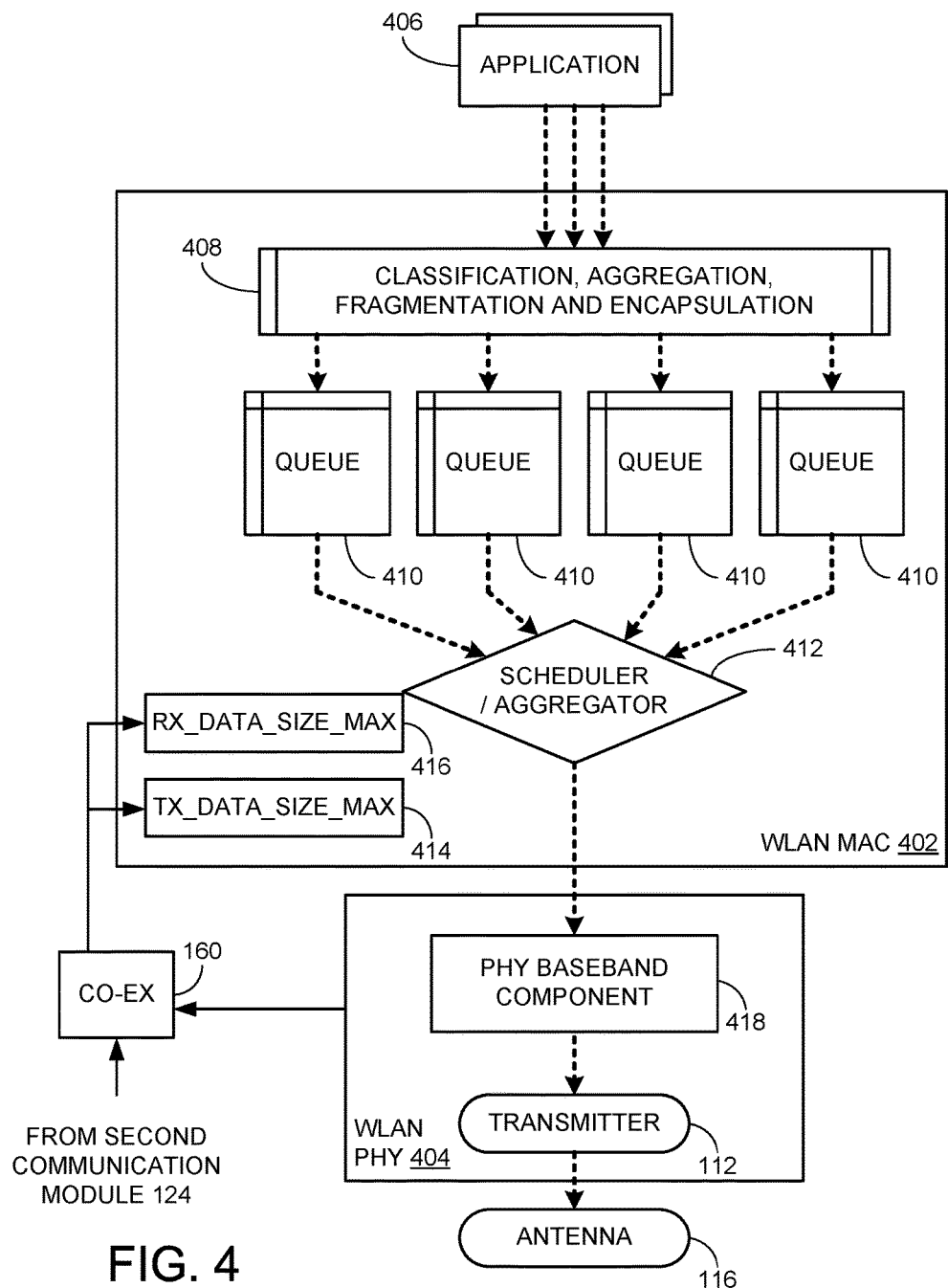
FIG. 4 illustrates particular aspects of the structure of a WLAN medium access control (MAC) sub-module and a WLAN physical (PHY) sub-module of a WLAN communication module.

FIG. 4 illustrates particular aspects of the structure of a WLAN medium access control (MAC) sub-module 402 and a WLAN physical (PHY) sub-module 404 of the WLAN communication module 104. Multiple applications 406 generate data to be transmitted by the WLAN transmitter 112. The applications 406 may generate any or any combination of streaming data (including voice and video), best effort data, and background data. Examples of applications that generate best effort data and background data include web browsers, e-mail clients and file transfer protocol (FTP)

clients. Examples of streaming applications include Internet Protocol television (IPTV), telephone calls using Real-Time Transport Protocol (RTP), video conferencing, and the like.

The data packets are passed to the WLAN MAC sub-module 402 as MAC service data units (MSDUs). A component 408 of the WLAN MAC sub-module 402 classifies the MSDUs, possibly aggregates multiple MSDUs having the same classification and having the same receiver address into an aggregated MSDU (A-MSDU), fragments classified MSDUs (or A-MSDUs) that are larger than a fragmentation threshold into fragments, and encapsulates each fragment or unfragmented MSDU (or A-MSDU) with a header and/or a footer, thus creating an MPDU (MAC protocol data unit).

The WLAN MAC sub-module 402 may comprise multiple prioritized queues 410 (four such queues are illustrated). Based on their classification, the MPDUs output by the component 408 are directed to respective ones of the prioritized queues 410. A scheduler/aggregator 412 schedules MPDUs from the prioritized queues 410 to be passed to the WLAN PHY sub-module 404. The scheduler/aggregator 412 possibly aggregates two or more MPDUs into an aggregated MPDU (A-MPDU). A value TX_DATA_SIZE may be used to denote the size in bytes of any single A-MPDU aggregated by the scheduler/aggregator 412.

Figure 5:
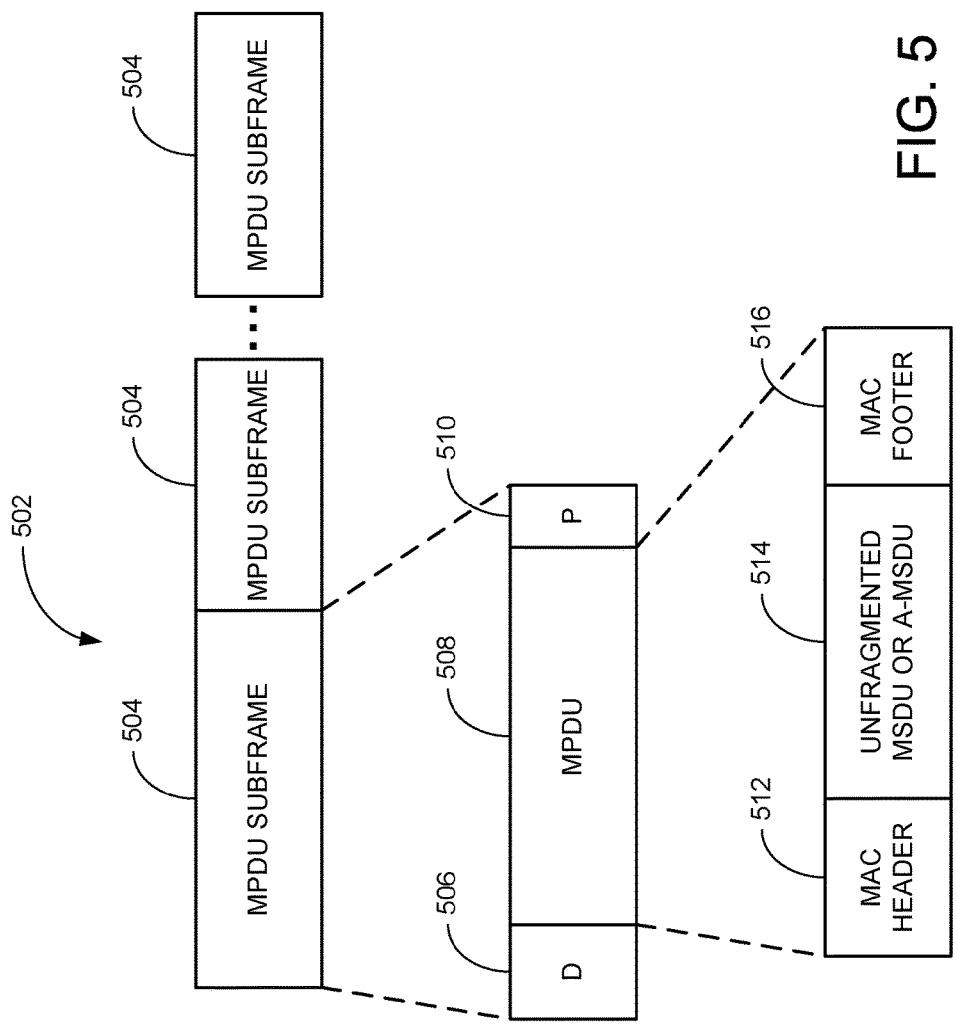
FIG. 5 illustrates the structure of an example aggregated MAC protocol data unit (A-MPDU)

The structure of an example A-MPDU 502 is illustrated briefly in FIG. 5. The A-MPDU 502 consists of one or more A-MPDU subframes 504. As illustrated in the first exploded view, each A-MPDU subframe 504 consists of an A-MPDU delimiter D 506, followed by an MPDU 508. Except when an A-MPDU subframe 504 is the last one in an A-MPDU 502, padding octets P 510 are appended to make each A-MPDU subframe 504 a multiple of 4 octets in length. The MPDU delimiter D 506 is 4 octets in length and its purpose is to locate the MPDUs 508 within the A-MPDU 502 so that the structure of the A-MPDU 502 can usually be recovered when one or more MPDU delimiters D 506 are received with errors. As illustrated in the second exploded view, each MPDU 508 may begin with a MAC header 512 and may end with a MAC footer 516. A payload 514 of an MPDU that becomes part of an A-MPDU is either an unfragmented MSDU or an unfragmented A-MSDU. (The payload of an MPDU that is not going to become part of an A-MPDU is either a fragment, or an unfragmented MSDU, or an unfragmented A-MSDU.)

Returning to FIG. 4, the scheduler/aggregator 412 passes MPDUs and A-MPDUs to the WLAN PHY sub-module 404, where they are received as physical PDUs (PPDUs). The WLAN PHY sub-module 404 comprises a PHY baseband component 418 and the transmitter 112. The PHY baseband component 418 may perform functions such as interleaving and encryption. Within the WLAN PHY sub-module 404, a preamble PHY_Preamble is appended to the beginning of the PPDU and padding may be appended to the end of the PPDU. Together, the beginning preamble PHY_Preamble and the padding at the end will be referred to as overhead time PHY_OH. The overhead time PHY_OH is a function of the WLAN PHY sub-module 404 and the preamble that will be used. In one example, the overhead time PHY_OH has a value of approximately 20 µs.

Accordingly, the transmission time for a particular A-MPDU is given by:

$$TX\_T = TX\_DATA\_SIZE/WLAN\_RATE + PHY\_OH + CW \quad [1]$$

where WLAN_RATE is the data rate for transmissions over the wireless medium in megabits per second (Mbps), and CW (contention window) denotes the time required to gain access to the wireless medium. The contention window CW is a function of the WLAN PHY sub-module 404 and the access class (AC). In one example, the contention window CW is approximately 67.5 µs.

As described previously, depending on the transmit power spectral density, some transmissions from the WLAN transmitter 112 may jam the LTE receiver 130, thereby preventing reception of any LTE DL traffic. To avoid such interference, the apparatus 102 may be configured such that the WLAN communication module 104 schedules its transmissions to avoid transmitting long frames (that is, longer than an ACK) during periods that are reserved for the LTE DL. These periods will herein be referred to as DL periods. Similarly, periods that are reserved for the LTE UL will herein be referred to as UL periods.

The WLAN communication module 104 is made aware of UL periods and DL periods of the LTE communication module 124 via the co-existence module 160. For example, the WLAN communication module 104 may receive from the LTE communication module 124, via the co-existence module 160, both an indication of the LTE TDD frame configuration that the LTE communication module 124 received from its serving eNB, and the LTE FRAME-SYNC, which is a synchronization signal to align timing of the start of the LTE TDD frame configuration.

In one implementation, the co-existence module 160 computes or estimates a maximum A-MPDU size TX_DATA_SIZE_MAX 414 that can be transmitted by the WLAN transmitter 112 without the transmission extending into a DL period of LTE communication module 124.

Firstly, the maximum transmission time TX_T_MAX that is available for the WLAN transmitter 112 to transmit may be computed using the LTE TDD frame configuration and the LTE FRAME_SYNC. Computation of the maximum transmission time TX_T_MAX may be performed at different points in time, and its value may change with each computation.

Figure 6:
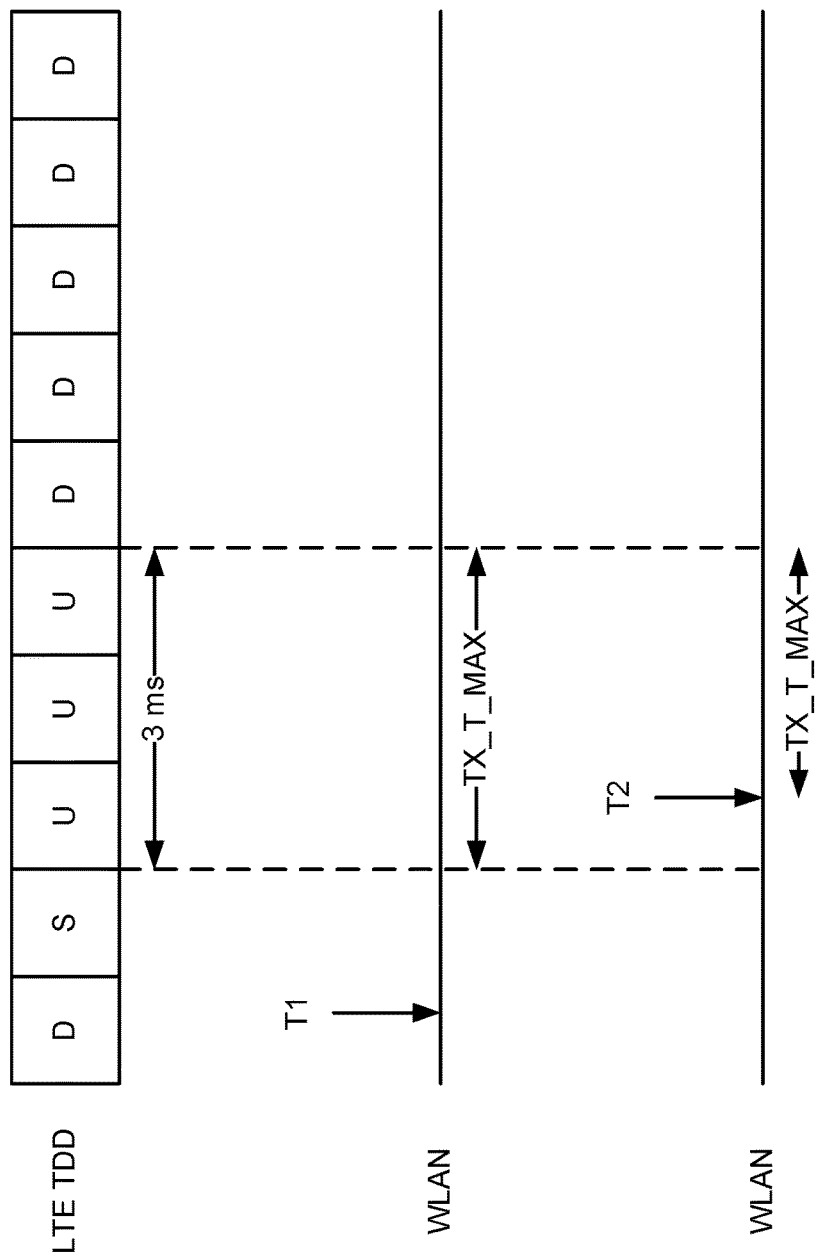
FIG. 6 illustrates example relationships between an example LTE TDD frame configuration and a maximum transmission time for a WLAN transmission.

FIG. 6 illustrates an example of how the maximum transmission time TX_T_MAX may change depending on the point in time at which it is computed. In this example, the LTE communication module 124 is scheduled to transmit and receive according to frame configuration #3 in Table 1. In this configuration, a sequence of three UL subframes begins at subframe #2. Together, these three subframes form a UL period of 3 ms in duration.

In the event that the maximum transmission time TX_T_MAX is computed at time T1, which is prior to the start of the UL period, the co-existence module 160 determines that the maximum transmission time is TX_T_MAX=3 ms. The co-existence module 160 indicates to the WLAN communication module 104 that transmission of long frames cannot begin until the start of the UL period (i.e., a time that coincides with the start of subframe #2).

In the event that the maximum transmission time TX_T_MAX is computed at time T2, which is after the start of the UL period, the co-existence module 160 that the maximum transmission time TX_T_MAX is some value less than 3 ms. The WLAN communication module 104 will be made aware, via the co-existence module 160, that transmission of A-MPDUs can begin immediately, because the current time (T2) is during the UL period.

At any point in time, the current value of the maximum transmission time TX_T_MAX may be used to compute a corresponding maximum A-MPDU size TX_DATA_SIZE_MAX 414 that can be transmitted by the WLAN transmitter 112 without the transmission extending into the DL period of LTE communication module 124. For example, Equation [1] may be rearranged as follows:

$$TX\_DATA\_SIZE\_MAX = WLAN\_RATE \cdot (TX\_T\_MAX - PHY\_OH - CW) \quad [2]$$

where now the PHY overhead PHY_OH is a worst-case overhead and the contention window CW is a worst-case window.

The scheduler/aggregator 412 may proceed to generate an A-MPDU having a size that comes as close as possible to—without exceeding—the maximum transmittable A-MPDU size TX_DATA_SIZE_MAX 414, subject, of course, to the availability of MPDUs in the queues and to the size of the MPDUs. Numerous methods are contemplated for achieving this result.

Figure 7:
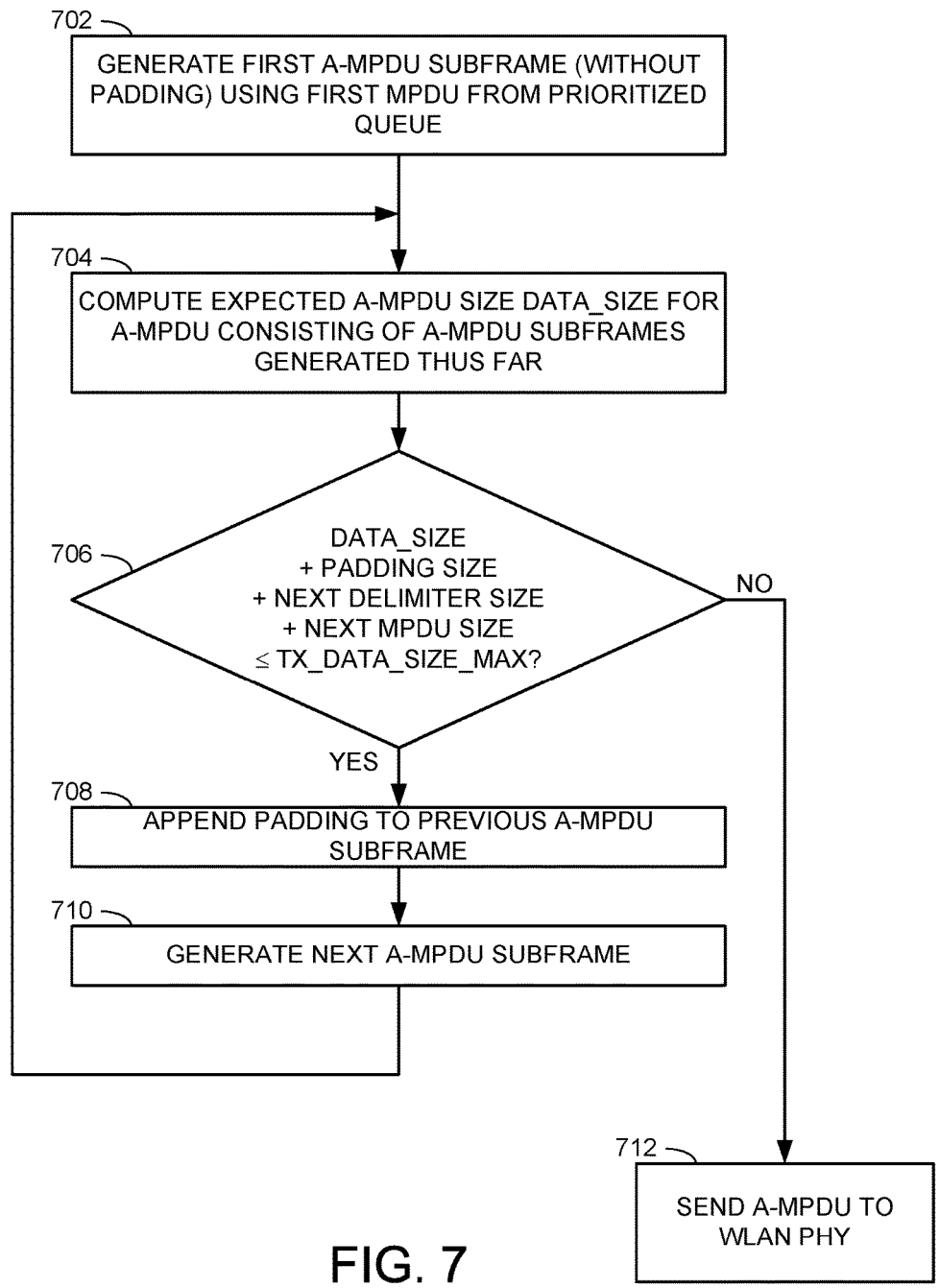
FIG. 7 illustrates an example method for generating an A-MPDU having a size not exceeding a maximum A-MPDU size.

FIG. 7 illustrates an example method for generating an A-MPDU having a size not exceeding a maximum transmittable A-MPDU size. The method of FIG. 7 will be described with reference to the structure of FIG. 4 and to the example A-MPDU structure illustrated in FIG. 5.

At 702, the scheduler/aggregator 412 generates a first A-MPDU subframe 504 using a first MPDU 508 from one of the prioritized queues 410. The first A-MPDU subframe 504 includes a delimiter D 506, but may not yet include a padding octet P 510.

At 704, the scheduler/aggregator 412 may compute the expected size TX_DATA_SIZE of an A-MPDU 502 consisting of the first A-MPDU subframe 504. At this point, the expected size TX_DATA_SIZE of the A-MPDU 502 includes the size of the first MPDU 508 and the size of the first delimiter D 506.

The scheduler/aggregator 412 may then proceed to determine whether it is possible to add the next MPDU 508 to the A-MPDU 502 without exceeding the maximum transmittable A-MPDU size TX_DATA_SIZE_MAX 414. In one example, at 706, the scheduler/aggregator 412 computes the sum of: (i) the current expected A-MPDU size TX_DATA_SIZE (as computed at 704), (ii) the size of a padding octet P 510 for the first MPDU 508, (iii) the size of a next delimiter D 506, and (iv) the size of the next MPDU 508 in the prioritized queue 410. In the event that the sum (TX_DATA_SIZE+padding octet size+delimiter size+next MPDU size) does not exceed the maximum transmittable A-MPDU size TX_DATA_SIZE_MAX 414 (as computed using Equation [2]), the scheduler/aggregator 412 may proceed to append the padding octet P 510 to the first A-MPDU subframe 504, as illustrated at 708, and generate a next A-MPDU subframe 504 (for the next MPDU in the queue), as illustrated at 710.

The scheduler/aggregator 412 then returns to 704, and proceeds to re-compute the current expected size TX_DATA_SIZE of the A-MPDU 502. At this point, the expected size TX_DATA_SIZE includes: the size of the first MPDU 508 and its delimiter D 506 and its padding octet P 510, and the size of the next MPDU 508 and its delimiter D 506.

The scheduler/aggregator 412 may then proceed to determine whether it is possible to add the next MPDU 508 in the prioritized queue 410 to the A-MPDU 502 without exceeding the maximum transmittable A-MPDU size TX_DATA_SIZE_MAX 414. In this manner, the scheduler/aggregator 412 may proceed to increase the size of the A-MPDU 502 by adding A-MPDU frames 504 until it is determined that the addition of the next A-MPDU frame 504 (for the next MPDU 508 in the prioritized queue 410) would cause the size of the A-MPDU 502 to exceed the maximum transmittable A-MPDU size TX_DATA_SIZE_MAX 414.

Once the scheduler/aggregator 412 determines at 708 that the sum of the current TX_DATA_SIZE, the size of a padding octet P 510 for the most recent A-MPDU subframe 504 added to the A-MPDU 502, the size of a delimiter D 506, and the size of the next MPDU 508 in the prioritized queue 410 exceeds the maximum transmittable A-MPDU size TX_DATA_SIZE_MAX 414, the scheduler/aggregator 412 may provide the A-MPDU to the WLAN PHY sub-module 404 for subsequent transmission to the AP 138. This is illustrated at 712.

After the transmission of the A-MPDU 502 to the AP 138, it is expected that the WLAN receiver 110 will receive an acknowledgement (ACK) from the AP 138 confirming that the A-MPDU 502 was successfully received by the AP 138. The ACK is expected at a time equivalent to the Short Interframe Space (SIFS) after the A-MPDU 502 is transmitted. However, if the ACK is transmitted by the AP 138 during the UL period, it is possible that the ACK will not be received by the receiver 110. This is because a UL transmission from the LTE transmitter 132 may jam the WLAN receiver 110, thereby preventing the reception of any DL traffic, such as the ACK.

To avoid the ACK being transmitted when the WLAN receiver 110 is desensitized, the transmission of the ACK should be timed such that is arrives after the end of the UL period of the LTE communication module 124 (i.e., during the subsequent DL period). This may be achieved by imposing an additional constraint on the timing of the transmission of the A-MPDU 502 by the WLAN communication module 104. For example, rather than transmitting the A-MPDU 502 as soon as it is ready for transmission, the transmission may be delayed so that it starts at a time TX_DATA_SIZE/WLAN_RATE before the end of the UL period. This timing would ensure that the entirety of the A-MPDU is transmitted by the WLAN transmitter 112 during the UL period, while also ensuring that the ACK is received by the WLAN receiver 110 during the DL period. It should be noted that this timing constraint requires that the LTE and WLAN transmission and reception periods be aligned within SIFS, a value which ranges from 10 μs to 28 μs, depending on the particular WLAN standard being used. Given the random aspect of the carrier sense multiple access (CSMA) protocol used in WLAN communication, it may be very difficult to achieve this alignment.

As an alternative to attempting to achieve this specific alignment, a more flexible WLAN ACK policy may be used which permits the WLAN communication module 104 to have more control over the timing of the ACKs received from the AP 138. The WLAN ACK policy that provides the highest flexibility in scheduling is High-Throughput (HT)-Delayed BlockAck. In order for communication to be performed according to the HT-Delayed BlockAck policy, both the WLAN communication module 104 and the AP 138 must support this feature. The WLAN communication module 104 may declare support for the HT-Delayed BlockAck policy in the HT Capabilities element in a Probe Request frame or Re-association Request frame. According to the HT-Delayed BlockAck policy, the AP 138 will not automatically return an ACK at a time SIFS after each A-MPDU transmission. Instead, the AP 138 will wait until it receives a Block ACK Request (BAR) from the WLAN transmitter 112, and will then send a Block ACK (BA) in response to the BAR. By delaying transmission of the Block ACK Request until a next DL period, the WLAN communication module 104 exploits the HT-Delayed BlockAck policy to ensure that the AP 138 only transmits Block ACKs to the apparatus 102 during DL periods, and not during UL periods, thereby avoiding the possibility that a WLAN ACK is transmitted when the WLAN receiver 112 is desensitized as a result of jamming by the LTE transmitter 132. It should be noted that, due to its short duration, transmission of the Block ACK Request by the WLAN transmitter 112 during the LTE DL period is unlikely to cause any de-sensing at the LTE receiver 130.

Figure 8:
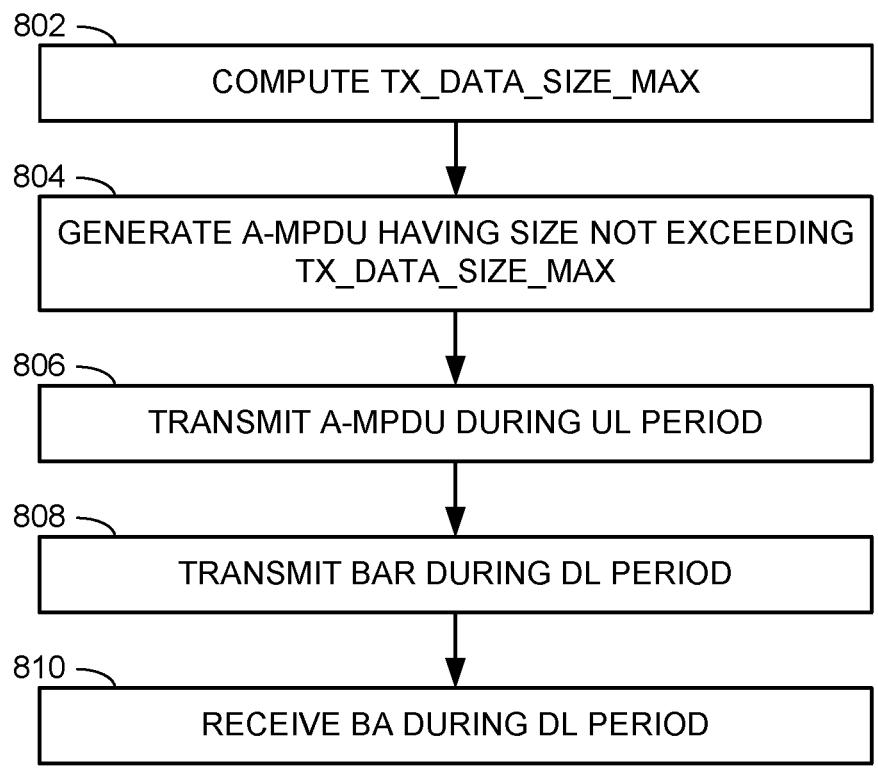
FIG. 8 illustrates an example method for using the HT-Delayed BlockAck policy to mitigate interference between co-located WLAN and LTE communication modules.

FIG. 8 illustrates an example method for exploiting the HT-Delayed BlockAck policy to mitigate interference between co-located WLAN and LTE communication modules.

At 802, the co-existence module 160 computes or estimates the maximum transmittable A-MPDU size TX_DATA_SIZE_MAX 414 as described previously, using Equation [2].

At 804, the scheduler/aggregator 412 generates an A-MPDU having a size that comes as close as possible to—without exceeding—the maximum transmittable A-MPDU size TX_DATA_SIZE_MAX 414, subject, of course, to the availability of MPDUs in the queues and to the size of the MPDUs. This may be done, for example, using the method illustrated in FIG. 7, although many other methods are contemplated for generating an A-MPDU having a size that comes as close as possible to but does not exceed TX_DATA_SIZE_MAX 414. The details of these methods are beyond the scope of the present disclosure.

At 806, the A-MPDU is transmitted via the WLAN transmitter 112 to the AP 138. As described previously, the A-MPDU should be transmitted during a UL period of the LTE communication module 124. In the event that the A-MPDU is ready for transmission during a UL period, the A-MPDU may be transmitted immediately. Alternatively, in the event that the A-MPDU is ready for transmission during a DL period, transmission of the A-MPDU may be delayed until the start of the next UL period.

Because the A-MPDU has been generated so as not to exceed the maximum transmittable A-MPDU size TX_DATA_SIZE_MAX 414, it is expected that transmission of the A-MPDU will not extend into the DL period.

The WLAN communication module 104 exploits the HT-Delayed BlockAck policy to ensure that, in the event that the A-MPDU transmission is completed more than SIFS before the end of the UL period, the WLAN receiver 110 will still be able to receive an acknowledgement of the transmission from the AP 138. As illustrated at 808, once the WLAN communication module 104 determines that the DL period has started, the WLAN transmitter 112 may transmit a Block ACK Request to the AP 138. Being of short duration, the Block ACK Request is unlikely to cause any de-sensing of the LTE receiver 130.

In response to the Block ACK Request transmission at 808, the WLAN receiver 110 may receive a Block ACK from the AP 138, indicating that the A-MPDU that was transmitted at 806 was successfully received. Because the Block ACK is received during the DL period of the LTE communication module 124, the LTE transmitter 132 is quiet and does not jam the WLAN receiver 110.

According to the example method illustrated in FIG. 8, the WLAN transmitter 112 transmits the Block ACK Request to the AP 138 during the DL period that is immediately after the UL period during which the A-MPDU was transmitted. However, the WLAN transmitter 112 may delay transmission of the Block ACK Request until a subsequent DL period. That is, the WLAN transmitter 112 may experience more than one UL period (and transmit more than one A-MPDU) prior to transmitting a Block ACK Request. The Block ACK that the WLAN receiver 110 receives in response to the Block ACK Request may acknowledge receipt by the AP 138 of all A-MPDUs transmitted by the WLAN transmitter 112 since a previous Block ACK.

Figure 9:
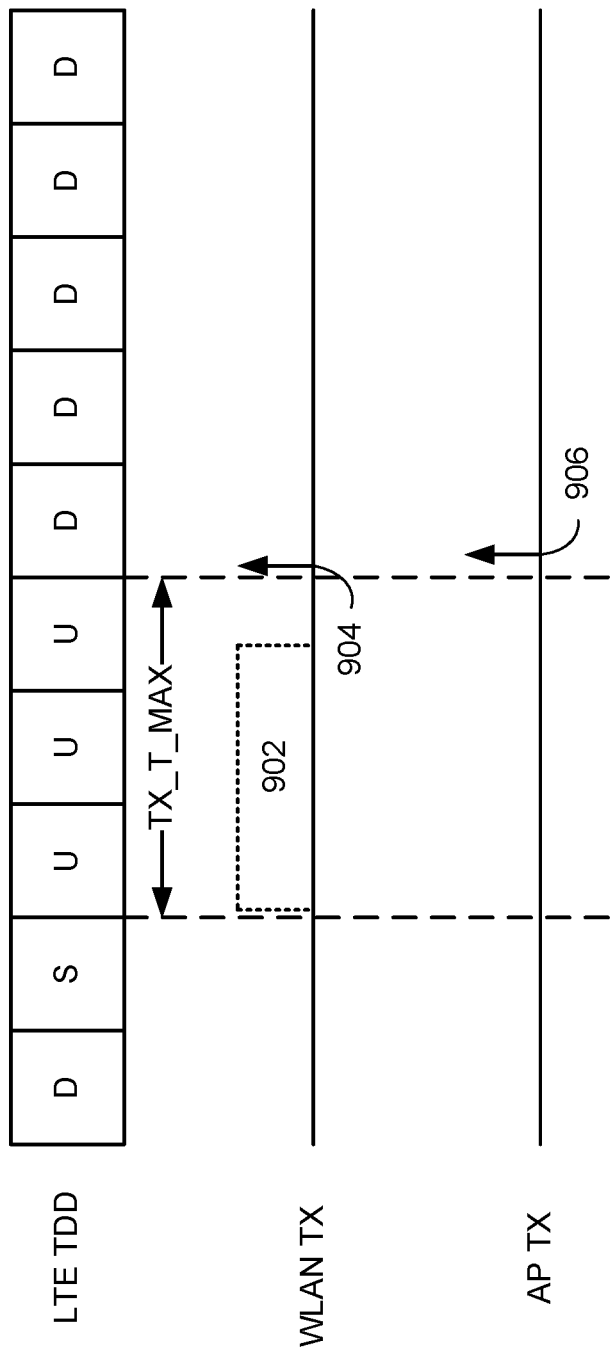
FIG. 9 illustrates an example timing diagram for an apparatus having co-located WLAN and LTE communication modules.

FIG. 9 illustrates an example timing diagram for an apparatus 102 having co-located WLAN and LTE communication modules. Similarly to FIG. 6, in the example of FIG. 9, the LTE communication module 124 is scheduled to transmit and receive according to frame configuration #3.

Using the maximum transmission time TX_T_MAX and Equation [2], a maximum transmittable A-MPDU size TX_DATA_SIZE_MAX 414 is computed, as previously described with reference to 802. The WLAN communication module 104 then generates an A-MPDU having a size not exceeding TX_DATA_SIZE_MAX 414, as previously described with reference to 804 (and described in more detail in the example method of FIG. 7). In one example, the size of the A-MPDU may be close to the maximum transmittable A-MPDU size TX_DATA_SIZE_MAX 414. The WLAN transmitter 112 transmits the A-MPDU during the UL period, as previously described with reference to 806. The A-MPDU transmission is illustrated at 902.

As described with reference to 808, the WLAN transmitter 112 transmits a Block ACK Request 904 during the DL period. Although FIG. 9 illustrates the Block ACK Request 904 as being transmitted at the start of the DL period, the Block ACK Request 904 may be transmitted at any time prior to SIFS before the end of the DL period.

A WLAN receiver of the AP 138 may receive the Block ACK Request 904, and, in response, a WLAN transmitter of the AP 138 transmits a Block ACK 906 to the apparatus 102. Because the Block ACK 906 is transmitted during the DL period of the LTE communication module 124, it may be successfully received by the WLAN receiver 110, as described previously with reference to 810.

According to the methods described thus far, jamming of the LTE receiver 130 may be reduced by ensuring that transmissions made by the WLAN transmitter 112 to the AP 138 are fully contained within LTE UL periods. However, there is also the possibility for interference in the opposite direction. That is, transmissions made by the AP 138 to the apparatus 102 during LTE UL periods may not be detected as a result of the WLAN receiver 110 being jammed by LTE transmissions from the co-located WLAN transmitter 132. Thus, another technique for mitigating interference between co-located WLAN and LTE communication modules of a single apparatus is to ensure that transmissions made by the AP to the apparatus are fully contained within the DL periods of the LTE communication module. The maximum reception time that is available for the WLAN receiver 110 to receive a transmission will herein by denoted RX_T_MAX. Similarly to the maximum transmission time TX_T_MAX, RX_T_MAX depends on the LTE TDD frame configuration.

Figure 10:
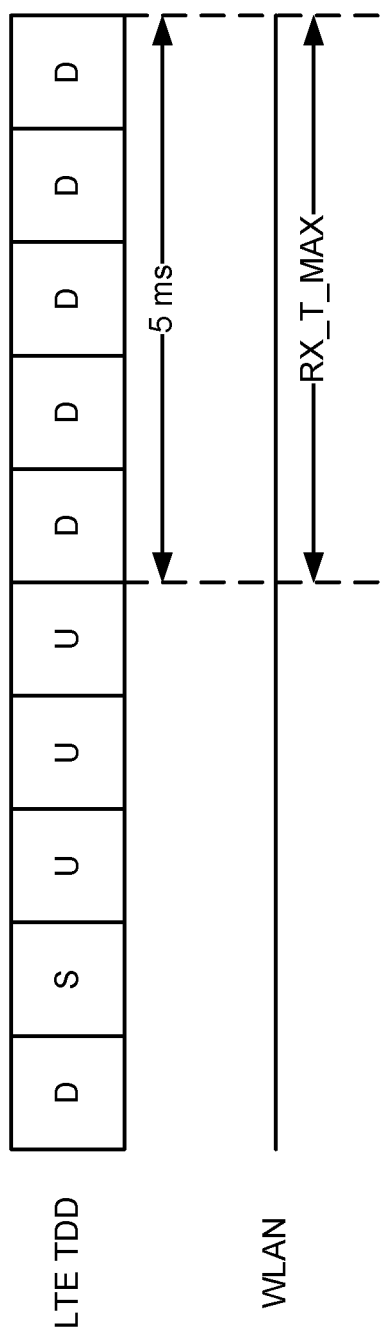
FIG. 10 illustrates an example relationship between an example LTE TDD frame configuration and a maximum reception time for a WLAN reception.

FIG. 10 illustrates an example relationship between an example LTE TDD frame configuration and a maximum reception time RX_T_MAX at the WLAN receiver 110. Similarly to FIG. 6, the LTE communication module 124 is scheduled to transmit and receive according to configuration #3 in Table 1. In this configuration, a sequence of five DL subframes begins at subframe #5. Together, these five subframes form a DL period of 5 ms. During this DL period, the LTE transmitter 132 is quiet. Therefore, this is a suitable time for the WLAN receiver 110 to receive transmissions from the AP 138.

In this example, the maximum time that is available for the WLAN receiver 110 to receive transmission from the AP 138 is RX_T_MAX=5 ms. Thus, it is of interest to ensure that the time it takes to receive an A-MPDU at the WLAN receiver 110 does not exceed RX_T_MAX=5 ms.

Using Equation [3], below, is it possible to compute a maximum receivable A-MPDU size RX_DATA_SIZE_MAX 416 that corresponds to the maximum time RX_T_MAX available for reception:

$$RX\_DATA\_SIZE\_MAX = WLAN\_RATE \cdot (RX\_T\_MAX - PHY\_OH - CW) \quad [3]$$

where WLAN_RATE denotes an estimate of the transmission rate of the AP 138 in megabits per second (Mbps), PHY_OH denotes an estimate of the PHY overhead time added by the PHY sub-module of the AP 138, and CW denotes an estimate of the time required by the AP 138 to gain access to the wireless medium. In one example, the estimated transmission rate WLAN_RATE is the last transmission rate that was used by the AP 138. Similarly, the estimated overhead time PHY_OH is, for example, the same PHY preamble and padding used by the last reception from the AP 138. In one example, the estimated contention window CW is a worst-case estimate.

The apparatus 102 may communicate to the AP 138 the maximum receivable A-MPDU size RX_DATA_SIZE_MAX 416 that it can receive by setting the Maximum A-MPDU length Exponent field of the HT Capabilities element in a Probe Request frame or Re-association Request frame. It is contemplated that this may be done once during a co-existence scenario, where a co-existence scenario is defined by the co-existence module 160. For example, the co-existence module 160 may send a signal LTE-COEX indicating that there is co-existing LTE communication, or a signal NO-COEX indicating that there is no co-existing communication. The maximum receivable A-MPDU size RX_DATA_SIZE_MAX 416 may be conveyed at least once to each AP with which the apparatus 102 associates. It may be conveyed again as the estimated transmission rate WLAN_RATE changes. In one example, the apparatus 102 may provide an updated maximum receivable A MPDU size RX_DATA_SIZE_MAX 416 whenever the estimated transmission rate WLAN_RATE changes by more than a certain threshold. Alternatively, this may be done more often or less often. Though there may be theoretical advantages to continuously updating the maximum receivable A-MPDU size RX_DATA_SIZE_MAX at the AP 138, implementation issues may arise at the AP 138. Such issues may include client-specific buffer-size allocation and the reaction of AP 138 to repeated re-association requests.

Figure 11:
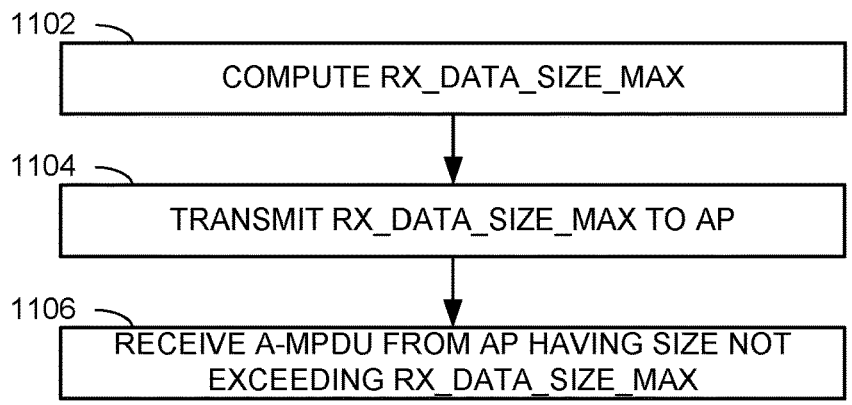
FIG. 11 illustrates an example method to be performed by an apparatus having co-located WLAN and LTE communication modules.

FIG. 11 illustrates a method to be performed by the apparatus 102 for ensuring that the A-MPDUs it receives from the AP 138 are sized to be contained within the LTE DL period of the LTE communication module 124.

At 1102, the maximum receivable A-MPDU size RX_DATA_SIZE_MAX 416 is computed using Equation [3].

At 1104, the apparatus 102 transmits an indication of the maximum receivable A-MPDU size RX_DATA_SIZE_MAX 416 to the AP 138. This may be done, for example, via a Probe Request frame or via a Re-association Request frame.

At 1106, the WLAN receiver 110 may receive an A-MPDU from the AP 138, where the size of the A-MPDU does not exceed the maximum receivable A-MPDU size RX_DATA_SIZE_MAX 416. In one example, the size of the A-MPDU may be close to the maximum receivable A-MPDU size RX_DATA_SIZE_MAX 416.

Figure 12:
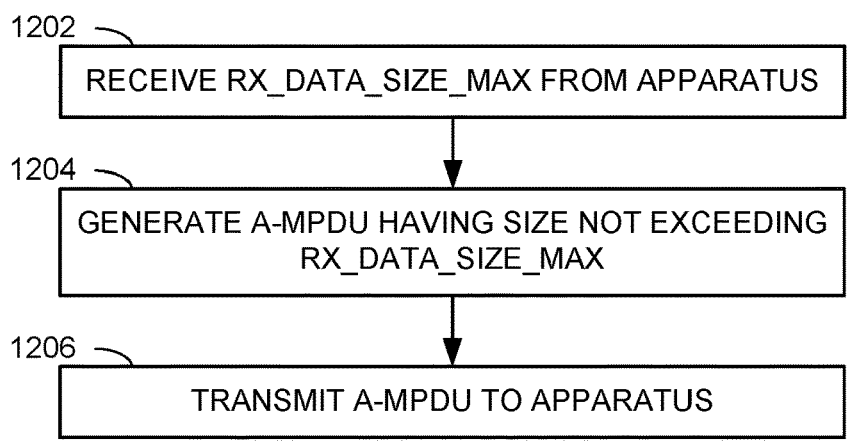
FIG. 12 illustrates an example method to be performed by an access point (AP) in communication with an apparatus having co-located WLAN and LTE communication modules.

FIG. 12 illustrates a method to be performed by the AP 138 for ensuring that the A-MPDUs it transmits to the apparatus 102 are sized according to instructions received from the apparatus 102.

At 1202, the AP 138 receives an indication of the maximum receivable A-MPDU size RX_DATA_SIZE_MAX 416 from the apparatus 102, for example, in the form of a Probe Request frame or a Re-association Request frame.

At 1204, a scheduler/aggregator of the AP 138 may generate an A-MPDU having a size not exceeding the maximum receivable A-MPDU size RX_DATA_SIZE_MAX 416. This may be done, for example, using a method similar to the method illustrated in FIG. 7, except that the determination made at 706 would involve the maximum receivable A-MPDU size RX_DATA_SIZE_MAX 416, instead of the maximum transmittable A-MPDU size TX_DATA_SIZE_MAX 414. As noted previously, many other methods are contemplated for generating an A-MPDU having a size that does not exceed a particular value, such as a maximum transmittable A-MPDU size TX_DATA_SIZE_MAX 414 or a maximum receivable A-MPDU size RX_DATA_SIZE_MAX 416. In one example, the size of the A-MPDU generated by the scheduler/aggregator of the AP 138 may be close to the maximum receivable A-MPDU size RX_DATA_SIZE_MAX 416.

At 1206, the AP 138 transmits to the apparatus 102 the A-MPDU that was generated at 1204.

Although the A-MPDU transmitted at 1206 has been generated such that it is sized to fit within the LTE DL period of the LTE communication module 124 of the apparatus 102, the specific timing of the DL periods may be unavailable to the AP 138. Consequently, there is no assurance that the AP 138 will transmit an A-MPDU at a suitable time (i.e., at a time that coincides with a DL period). To prevent the AP 138 from transmitting an A-MPDU at an unsuitable time (i.e., during a UL period in which the WLAN receiver 110 may be de-sensed by an LTE transmission), the apparatus 102 may instruct the AP 138 when to send downlink traffic. This may be done by having the apparatus 102 transmit a PS-Poll frame to the AP 138 in order to solicit downlink traffic. In one example, illustrated in FIG. 13, the apparatus 102 may transmit a PS-Poll frame to the AP 138 at the start of a DL period, as shown at 1302. The AP 138 may respond to the PS-Poll frame by transmitting a buffered A-MPDU, which is received by the apparatus 102, as illustrated at 1304.

Figure 13:
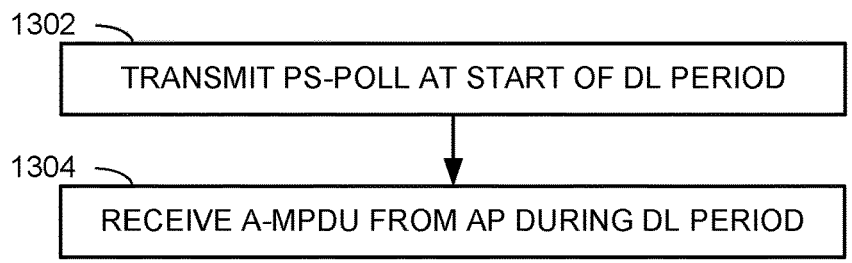
FIG. 13 illustrates a second example method to be performed by an apparatus having co-located WLAN and LTE communication modules.

The method of FIG. 13 may be combined with the method of FIG. 11. That is, in addition to transmitting the PS-Poll frame to the AP 138, the apparatus 102 may have also transmitted a maximum receivable A-MPDU size RX_DATA_SIZE_MAX 416 to the AP 138. Accordingly, the buffered A-MPDU that is received by the apparatus 102, as shown at 1304, may have been generated by the AP 138 such that its size does not exceed the maximum receivable A-MPDU size RX_DATA_SIZE_MAX 416.

Figure 14:
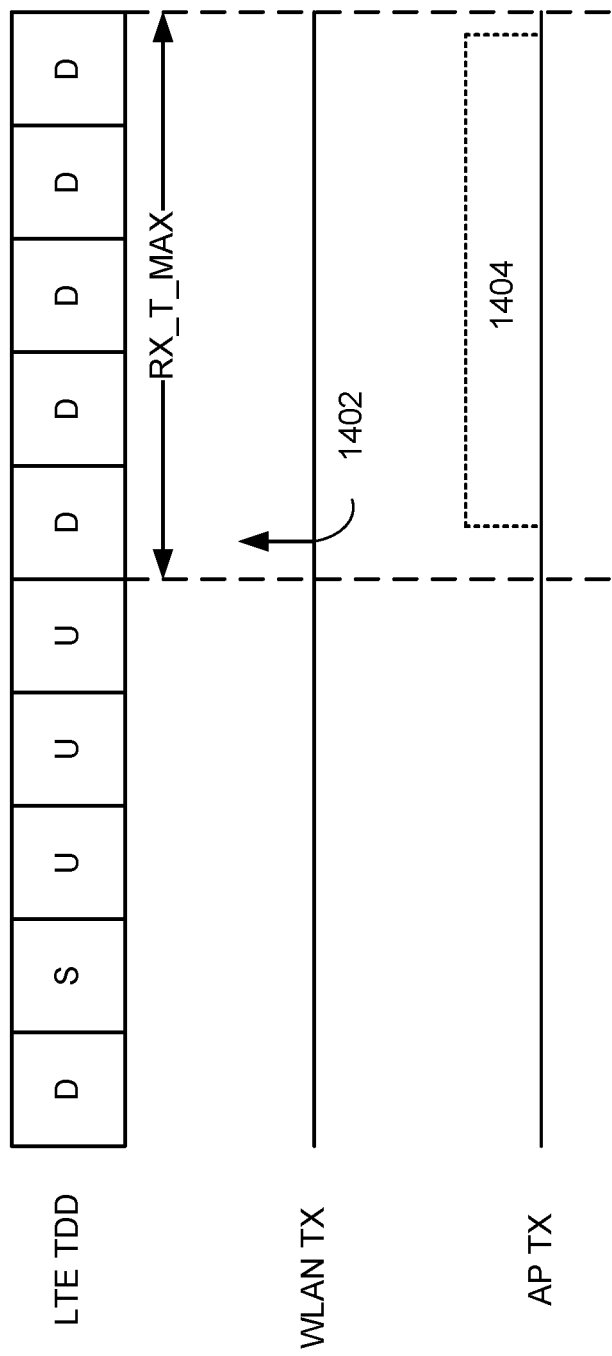
FIG. 14 illustrates an example timing diagram for an apparatus having co-located WLAN and LTE communication modules.

FIG. 14 illustrates an example timing diagram for an apparatus 102 having co-located WLAN and LTE communication modules. Similarly to FIGS. 6, 9 and 10, in the example of FIG. 14, the LTE communication module 124 is scheduled to transmit and receive according to frame configuration #3.

As described with reference to 1302, the WLAN transmitter 112 transmits a PS-Poll 1402 at the start of the DL period.

The WLAN receiver of the AP 138 may receive the PS-Poll 1402, and, in response, the WLAN transmitter of the AP 138 transmits a buffered A-MPDU 1404 to the apparatus 102. Because the A-MPDU 1404 is transmitted during the DL period of the LTE communication module 124, it may be successfully received by the WLAN receiver 110, as described previously with reference to 1304. Furthermore, by generating the A-MPDU 1404 in accordance with the method of FIG. 12, the A-MPDU 1404 may be sized such that it does not exceed the maximum receivable A-MPDU size RX_DATA_SIZE_MAX 416. Accordingly, transmission of the A-MPDU 1404 may be entirely contained within the DL period of the LTE communication module 124. In one example, the size of the A-MPDU 1404 may be close to the maximum receivable A-MPDU size RX_DATA_SIZE_MAX 416.

Figure 15:
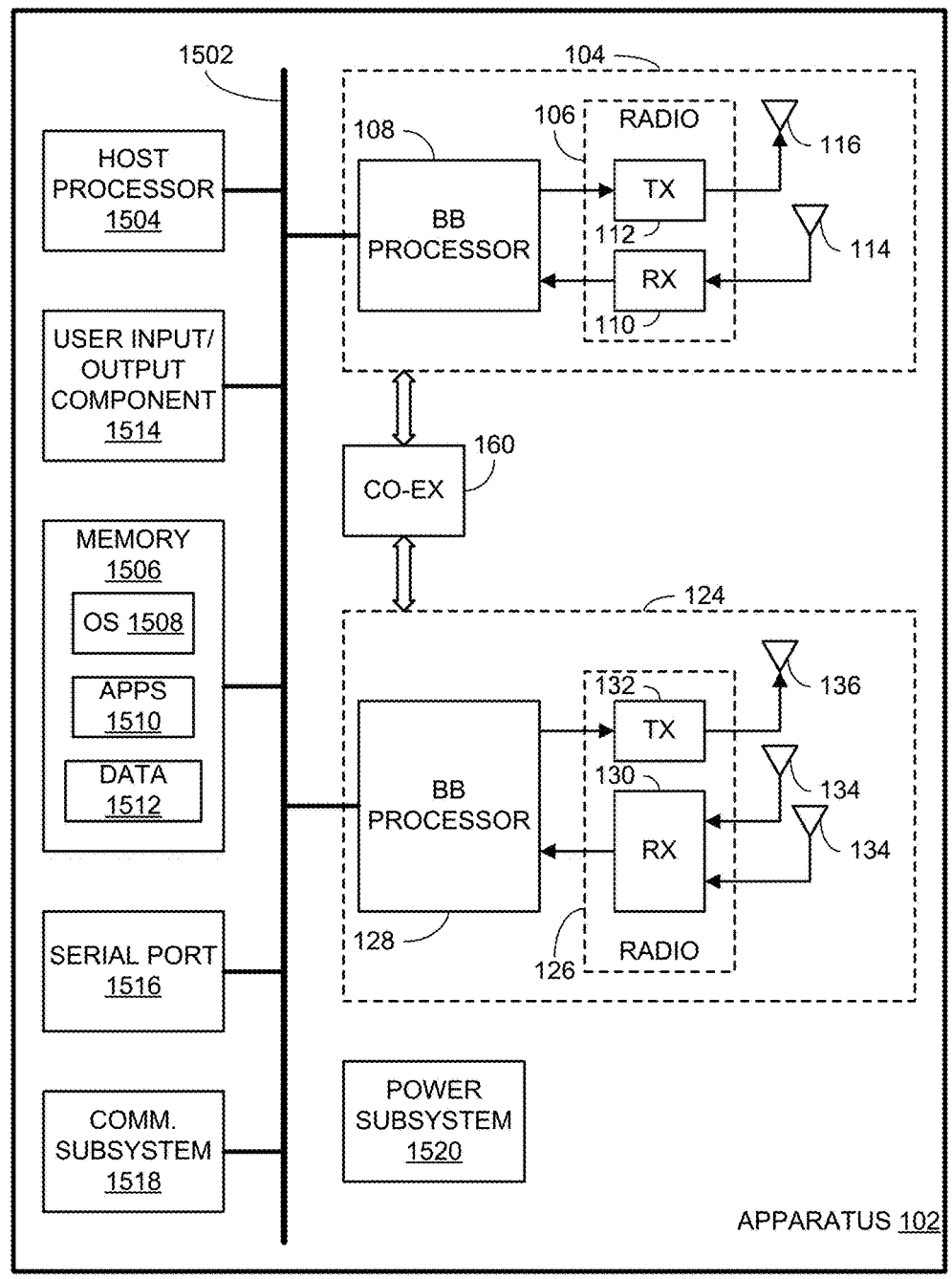
FIG. 15 illustrates an example functional block diagram of an example apparatus having WLAN and LTE communication modules.

FIG. 15 illustrates an example functional block diagram of an example apparatus, for example apparatus 102. Those features of apparatus 102 illustrated in FIG. 1 are illustrated also in FIG. 15. The apparatus 102 has an internal bus 1002 to which the first baseband processor 108 and the second baseband processor 128 are coupled. The apparatus 102 comprises one or more host processors 1504 coupled to the internal bus 1502 and a memory 1506 coupled to the internal bus 1502. The memory 1506 stores an operating system 1508, various applications 1510, and data 1512 for use by the operation system 1508 or by the various applications 1510 or by both. A non-exhaustive list of examples for applications 1510 includes a calendar application, a task application, an address book application, an instant messaging application, a browser application, and the like. In the case where the applications 1410 include a telephony application, the apparatus 102 comprises smartphone functionality.

One or more user input/output components 1514 are coupled to the internal bus 1502. A non-exhaustive list of examples for user input/output components 1514 includes a display screen, a touch screen, an optical pad, a keyboard, a keypad, pressable buttons, a trackball, a trackpad, a thumbwheel, a microphone, a speaker, and the like. Configuration of the apparatus 102 may involve the one or more user input/output components 1514.

The apparatus 102 may optionally comprise one or more serial ports 1516 (for example, universal serial bus (USB) or micro-USB ports) coupled to the internal bus 1502.

The apparatus 102 may optionally comprise one or more communication subsystems 1518 coupled to the internal bus 1502. A non-exhaustive list of examples for communication subsystems 1518 includes a wired communication module, a wireless personal area network communication module, a near field communications (NFC) module, a global positioning system (GPS) subsystem, and the like.

The apparatus 102 comprises a power subsystem 1520 that supplies power to the various electronic components in the apparatus 102. The power subsystem 1520 may be any form of power supply, such as a conventional rechargeable battery (removable or non-removable), a fuel cell system, a solar cell, or the like, or any combination thereof. The apparatus 102 in some implementations may be electrically connectable to a fixed power supply such as a wall outlet. However, in those cases where the power subsystem 1520 supports the portability of the apparatus 102, the apparatus effectively comprises a mobile wireless communication device.

The apparatus 102 may comprise other components that are not illustrated in FIG. 15 so as not to obscure the description of the technology of interest.

Although, thus far, the co-existence module 160 has been described as performing various computations, such as the computation of the maximum transmittable A-MPDU size TX_DATA_SIZE_MAX 414 and the maximum receivable A-MPDU size RX_DATA_SIZE_MAX 416, it is contemplated that these computations may be performed by one or more additional or alternative components of the apparatus 102.

What is claimed is:

1. A method for co-existence in an apparatus having a wireless local area network (WLAN) communication module and a Long Term Evolution (LTE) communication module, the method comprising:
    the WLAN communication module selecting a High Throughput (HT)-Delayed Block Acknowledgement (ACK) policy for communications in a WLAN frequency band with an access point (AP);
    the WLAN communication module transmitting an aggregated medium access control (MAC) protocol data unit (A-MPDU) to the AP during an uplink period reserved by an evolved base node (eNB) for uplink communications, the eNB serving the LTE communication module, the LTE communication module operative in one or more LTE Time Division Duplex (TDD) frequency bands that are adjacent or near the WLAN frequency band; and
    the WLAN communication module transmitting a Block ACK Request to the AP during a downlink period reserved by the eNB for downlink communications that follows the uplink period.

2. The method of claim 1, further comprising:
    the WLAN communication module receiving from the AP, during the downlink period, a Block ACK in response to the Block ACK Request.

3. The method of claim 1, further comprising:
    the WLAN communication module ensuring that a size of the A-MPDU does not exceed a maximum size that was calculated as a function of a duration of the uplink period.

4. The method of claim 1, further comprising:
    the WLAN communication module ensuring that a size of the A-MPDU does not exceed a maximum size that was calculated as a function of a remaining duration of the uplink period.

5. The method of claim 1, further comprising:
    the WLAN communication module calculating a start time for transmission of the A-MPDU to ensure that transmission of the A-MPDU does not extend beyond the uplink period.

6. An apparatus comprising:
    a host processor;
    a wireless local area network (WLAN) communication module coupled to the host processor, the WLAN communication module operative for communications in a WLAN frequency band with an access point (AP) according to a High Throughput (HT)-Delayed Block Acknowledgement (ACK) policy; and
    a Long Term Evolution (LTE) communication module coupled to the host processor, the LTE communication module operative in one or more LTE Time Division Duplex (TDD) frequency bands that are adjacent or near the WLAN frequency band,
    wherein the WLAN communication module is operative to transmit an aggregated medium access control (MAC) protocol data unit (A-MPDU) to the AP during an uplink period reserved by an evolved base node (eNB) for uplink communications, the eNB serving the LTE communication module, and
    wherein the WLAN communication module is operative to transmit a Block ACK Request to the AP during a downlink period reserved by the eNB for downlink communications that follows the uplink period.

7. The apparatus of claim 6, wherein the WLAN communication module is further operative to receive from the AP, during the downlink period, a Block ACK in response to the Block ACK Request.

8. The apparatus of claim 6, wherein the WLAN communication module is further operative to ensure that a size of the A-MPDU does not exceed a maximum size that was calculated as a function of a duration of the uplink period.

9. The apparatus of claim 6, wherein the WLAN communication module is further operative to ensure that a size of the A-MPDU does not exceed a maximum size that was calculated as a function of a remaining duration of the uplink period.

10. The apparatus of claim 6, wherein the WLAN communication module is further operative to calculate a start time for transmission of the A-MPDU to ensure that transmission of the A-MPDU does not extend beyond the uplink period.

* * * * *